United States Patent
Favero et al.

(10) Patent No.: US 9,656,888 B2
(45) Date of Patent: May 23, 2017

(54) FUNCTIONALIZED CATIONIC POLYAMINES AND THEIR USE TO REDUCE THE NDMA FORMATION DURING THE TREATMENT OF AQUEOUS SYSTEMS, AND APPLICATIONS IN THE WATER TREATMENT INDUSTRY, INCLUDING WASTEWATER AND DRINKING WATER TREATMENT PROCESSES

(71) Applicant: S.P.C.M. SA, Andrezieux Boutheon (FR)

(72) Inventors: Cedrick Favero, Givors (FR); Amelia E. Taylor, Pearl River, LA (US)

(73) Assignee: S.P.C.M. SA, Andrezieux Boutheon (FR)

( * ) Notice: Subject to any disclaimer, the term of this patent is extended or adjusted under 35 U.S.C. 154(b) by 41 days.

(21) Appl. No.: 14/161,104

(22) Filed: Jan. 22, 2014

(65) Prior Publication Data

US 2014/0131284 A1 May 15, 2014

Related U.S. Application Data

(62) Division of application No. 12/937,999, filed as application No. PCT/IB2008/001241 on Apr. 18, 2008, now abandoned.

(51) Int. Cl.
| | |
|---|---|
| *C07C 211/63* | (2006.01) |
| *C07C 209/00* | (2006.01) |
| *C02F 1/52* | (2006.01) |
| *C02F 1/56* | (2006.01) |
| *C08G 73/02* | (2006.01) |
| *C02F 101/38* | (2006.01) |

(52) U.S. Cl.
CPC ............... *C02F 1/5272* (2013.01); *C02F 1/56* (2013.01); *C08G 73/022* (2013.01); *C02F 2101/38* (2013.01); *C02F 2303/04* (2013.01)

(58) Field of Classification Search
None
See application file for complete search history.

(56) References Cited

U.S. PATENT DOCUMENTS

| | | | | |
|---|---|---|---|---|
| 3,738,945 A | * | 6/1973 | Panzer et al. | ........... 528/405 |
| 2004/0238138 A1 | | 12/2004 | Ishizaki et al. | |
| 2011/0257435 A1 | | 10/2011 | Favero et al. | |

FOREIGN PATENT DOCUMENTS

| | | |
|---|---|---|
| EP | 0819651 A1 | 1/1998 |
| JP | 2001293950 A | 10/2001 |
| WO | 03/016379 A1 | 2/2003 |

OTHER PUBLICATIONS

Park et al (A study of the effect of polymers on potential N-Nitrosodimethylamine (NDMA) formation at water and wastewater treatment plants, Multimedia Environmental Simulations Laboratory, Georgia Institute of Technology, Jun. 2007, pp. 1-96; https://smartech.gatech.edu/bitstream/handle/1853/28703/MESL_SNF_Report_MESL-03-07S.pdf?sequence=1).*
Sang Hyuck Park, "Effect of Amine-Based Water Treatment Polymers on the Formation of N-Nitrosodimethylamine (NDMA) Disinfection by-Product," Dissertation for Degree Doctor of Philosophy in the School of Civil and Environmental Engineering, Jan. 7, 2008, pp. IV-175.
International Search Report for PCT/IB2008/001241 dated Jun. 26, 2009.

* cited by examiner

*Primary Examiner* — Rachel Kahn
(74) *Attorney, Agent, or Firm* — Heslin Rothenberg Farley & Mesiti P.C.

(57) ABSTRACT

New water treatment chemicals and corresponding water treatment or more generally aqueous systems treatment processes are provided, which greatly attenuate the NDMA problem, that is, decrease the formation of NDMA during the water or aqueous system treatment namely in the presence of a disinfectant, and decrease too the level of NDMA in the so treated water of aqueous system, and in the end products such as drinking water.

9 Claims, No Drawings

FUNCTIONALIZED CATIONIC POLYAMINES AND THEIR USE TO REDUCE THE NDMA FORMATION DURING THE TREATMENT OF AQUEOUS SYSTEMS, AND APPLICATIONS IN THE WATER TREATMENT INDUSTRY, INCLUDING WASTEWATER AND DRINKING WATER TREATMENT PROCESSES

CROSS REFERENCE TO RELATED APPLICATIONS

This application is a divisional application of U.S. application Ser. No. 12/937,999 (which published on Oct. 20, 2011 as US 2011-0257435 A1), which is a national stage filing under section 371 of International Application No. PCT/IB2008/001241 filed on Apr. 18, 2008, and published in English on Oct. 22, 2009 as WO 2009/127893. The entire disclosures of each of the prior applications are hereby incorporated herein by reference.

This invention relates to new functionalized cationic polyamines and their uses and, more particularly, to linear or branched polyamines also known as (epichlorohydrin-dimethylamine) based polymers end-capped with, at least, one alkylating agent.

The uses of polyamines in various industrial applications are well known. Mention may be made of their uses in water treatment, the papermaking industry, the mining industry, the textile industry, etc. . . . .

Among those applications, their use as coagulation/flocculation agents in drinking water or wastewater treatment was reported to have a considerable number of advantages (lower dosage required, lower volumes of sludge produced . . . ) compared with standard mineral coagulants.

It is to be noted that the terms flocculent and coagulant are often used interchangeably. However, coagulants are chemicals that promote particle destabilisation by charge neutralisation (and therefore assist in color and turbidity removal) wherein flocculants cause colloids and other suspended particles in liquids to aggregate, forming a so called "floe". For this technology, polyamines shall be considered coagulants.

N-Nitrosodimethylamine (NDMA), also known as dimethylnitrosamine, is an industrial waste product of several industrial processes that is highly toxic.

Until recently, concerns about NDMA mainly focused on the presence of NDMA in food and polluted air. However, its presence in drinking water sources at potentially harmful levels is of increasing concern as NDMA does not readily biodegrade, adsorb, or volatilize.

Current results suggest that NDMA is a water treatment by-product associated with the disinfection process in both drinking water and wastewater (disinfection processes using, for example, free chlorine, monochloramine, or chlorine dioxide). In some particular cases, concentrations of NDMA leaving wastewater and drinking water treatment plants have been observed at levels higher than entering the plants, suggesting that NDMA occurrence is related to treatment practices.

The NDMA formation pathway during water treatment processes is a highly complex phenomenon and is still not fully understood. It seems that it could be the result from reactions occurring via chlorination of organic nitrogen-containing wastewater. Accordingly, there is a strong need to provide cost efficient water treatment chemicals and corresponding treatment processes that will allow reliable NDMA management for the control and if possible reduction of the NDMA concentration in water leaving the disinfection stage.

SUMMARY OF THE INVENTION

An object of the present invention is to provide new water treatment chemicals which greatly attenuate the NDMA problem described in the preceding paragraphs.

The present invention relates to functionalized polyamines and their uses. More specifically, the present invention relates to a functionalized cationic polyamine end-capped with, at least, one alkylating agent, in particular and non-limitatively (epichlorohydrin-dimethylamine) polymers end-capped with, at least, one alkylating agent. More particularly, the present invention relates to improved water treatment processes using as coagulation/flocculation agent, in whole or in part, those new (epichlorohydrin-dimethylamine) based polymers end-capped with, at least, one alkylating agent.

GENERAL DESCRIPTION OF INVENTION

It is claimed for the present invention that it has surprisingly been found that it is possible to keep the NDMA level as low as possible during coagulation/flocculation processes by using as water treatment chemical, in whole or in part a functionalized cationic polyamine end-capped with, at least, one alkylating agent.

The present invention therefore relates inter alia to compositions for use in water treatment processes, applied namely to water or more generally in aqueous systems occurring in wastewater treatment and in drinking water production, namely to control the level of NDMA to a level as low as possible, in particular during coagulation/flocculation processes applied to the said water or aqueous systems, characterized in that the said composition comprises a cationic polyamine end-capped with, at least, one alkylating agent. According to the invention, this end-capped polyamine will hereafter be named "functionalized polyamine".

The present invention also relates to water or wastewater or more generally aqueous systems treated with a functionalized polyamine or of a composition comprising such a "functionalized polyamine", namely drinking water, and disinfection processes of water or wastewater or more generally aqueous systems characterized in that they comprise a step of adding an appropriate amount of a "functionalized polyamine" or of composition comprising such a "functionalized polyamine, in order to reduce the level of NDMA in the said water or wastewater or more generally aqueous systems.

The new products, processes, or compositions of the invention apply in particular to any industry where an aqueous system, wastewater, or water, is disinfected as described herein and therefore also applies to disinfection processes of water or wastewater or aqueous systems characterized in that they comprise a step of adding an appropriate amount of a "functionalized polyamine" or of a composition comprising such a "functionalized polyamine", in order to reduce the level of NDMA in the said water or wastewater or aqueous system.

In the present application including the claims, the word "reduce" has to be understood as actually reducing the NDMA initial level to a lower level, or to reduce the increase of the concentration of NDMA. The skilled man is very familiar with the levels of NDMA, depending on the considered plant, the considered treatment, the considered additives used for the treatment, the considered starting aqueous system and the considered end product requisites (such as drinking water requisites) and will be able to very simply adapt the present invention and the examples give, herein to any particular case.

More precisely functionalized polyamines which can be prepared according to a process which comprises reacting a secondary amine and a difunctional epoxide compound to produce polymer, followed by reaction with an alkylating agent containing at least one group capable of reacting with the polymer's amine end groups in aqueous solvents, i.e., end-capping.

Still more specifically, the present invention relates to a functionalized cationic polyamine end-capped with, at least, one alkylating agent, in particular and non-limitatively (epichlorohydrin-dimethylamine) polymers end-capped with, at least, one alkylating agent.

More particularly, the present invention also relates to improved water treatment processes using as coagulation/flocculation agent, in whole or in part, (epichlorohydrin-dimethylamine) based polymers end-capped with, at least, one alkylating agent.

The present invention relates also to water treatment processes using the functionalized polyamines of the invention, such as the process industry, wastewater treatment, and drinking water production.

Reactants a/ Amines

The amines useful in the present invention are secondary amines and should be water soluble. They include dimethylamine, diethylamine, dipropylamines, and secondary amines containing mixtures of alkyl groups having 1 to 3 carbon atoms. In a preferred embodiment, the secondary amine is dimethylamine. Other amines may be used, however, it is important that they contain a relatively short hydrocarbon chain due to reactive concentrations and water solubility. Mixtures of secondary amines may also be employed. It is to be noted that secondary amines are bifunctional in reaction with the bifunctional epoxy type reactants. For this, where a secondary amine is the sole amine type used, the polymer obtained has a linear structure.

Additionally, the use of polyfunctional amines is one of the factors that influence molecular weight and degree of branching. With increasing functionality of the amine, higher molecular weights are achievable at the expense of linearity. For this purpose, polyfunctional amines may be advantageously employed. They include polyalkylene polyamines, such as diethylenetriamine, piperazine, triethylenetetramine, bishexamethylenediamine, and alkylenediamines of about 2-6 carbon atoms, such as ethylenediamine, propylenediamine, and hexamethylenediamine. Ammonia and primary amines are also polyfunctional in their reaction with an epoxy type reactant and may be employed as an equivalent to a polyfunctional amine. The only requirement as to the use of a primary amine is that it possesses sufficient reactivity with the epoxy type compound to exhibit polyfunctional reaction and that its use does not result in water insolubility of the resulting polyquaternary polyamine. Preferred primary amines are lower alkyl amines wherein the alkyl groups contain up to about 3 carbon atoms.

b/ Difunctional Epoxide Compounds

Difunctional epoxide compounds useful for the purpose of our invention are those which contain an epoxide group which is readily broken in a condensation polymerization reaction as well as another reactive functional group.

Examples of compounds which are useful include epibromohydrin, epiiodohydrin and, in a preferred embodiment, epichlorohydrin. Diepoxides are also compounds useful for the purpose of our invention despite the facts that they are generally more expensive and they reduce the resulting polyamine cationic charge density.

c/ Alkylating Agents

Alkylation of tertiary amines chain ends (end-capping) can be performed by any monofunctional alkylating agent. Known reactants are monofunctional epoxides, alkyl halides such as methyl chloride, benzyl chloride, dimethyl sulfate, diethyl sulfate, allyl chloride . . . .

One particular and preferred type of alkylating agent useful for the present invention contains at least one group capable of reacting with amine groups, and can be represented by the following general formula: n=0-16

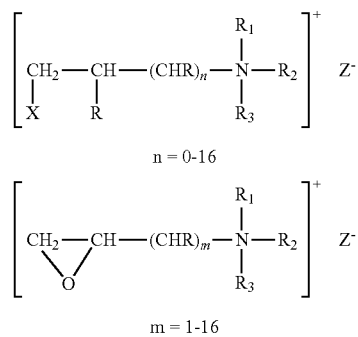

X is a halogen, Z is an anion, such as a halide or hydroxyl group, and R, R1, R2 and R3, which can be the same or different, are hydrogen, alkyl, hydroxyalkyl, alkenyl, or aryl groups.

They can be prepared according to conventional procedures.

Some compounds are commercially available, such as:
2,3-epoxypropyl-N,N,N-trimethylammonium chloride
3-chloro-2-hydroxypropyl-N,N,N-trimethylammonium chloride
3-chloro-2-hydroxypropyl-N,N,N-dimethylethanolammonium chloride
1,3-bis-(3-chloro-2-hydroxypropyl-N,N-dimethylammonium)-N-propane dichloride, all of them being manufactured by Degussa™ A.G., Dow Chemical™, Samsung™ and other manufacturers.

Particularly preferred are 3-chloro-2-hydroxypropyl-N,N, N-trimethylammonium chloride and 2,3-epoxypropyl-N,N, N-trimethylammonium chloride.

Preferred Non Limited Processes of Manufacturing a/ Linear Functionalized Polyamine The chain reaction of a difunctional epoxide compound (preferably epichlorohydrin) with a secondary amine (preferably dimethylamine) is exothermic; accordingly, some care should be exercised to control the temperature during preparation of the reaction mixture.

In practice the reaction proceeds in two stages: at 20-30° C. the secondary amine is added to the difunctional epoxide (or vice versa), followed by increasing the temperature to 50-80° C. which constitutes a preferred practical range.

Once the obtained polyamine exhibits the desired viscosity, the alkylating agent is added in an amount necessary to convert the tertiary amine chain end to the desired quaternary end group, the reaction mixture is then cooled and/or diluted and/or pH adjusted to give the corresponding end-capped polyamines.

b/ Branched Functionalized Polyamine

When producing functionalized polyamines from both secondary amine(s) (preferably dimethylamine) and polyfunctional amine(s) (preferably ethylenediamine) by reaction with difunctional epoxy compounds (preferably epichlorohydrin), additional amounts of epoxy type reactants are required due to the increased functionality of polyfunctional amine(s) over secondary amine(s). Nevertheless, the same general procedure as for a linear functionalized polyamine is employed for which exist two preferred variants.

First, the secondary amine and the difunctional epoxide compound are reacted to a significant degree in aqueous medium. At this point, the polyfunctional amine is added and the reaction maintained until the desired viscosity is reached.

In a second alternative, the secondary amine and polyfunctional amine are mixed together and subsequently reacted with the difunctional epoxide compound in aqueous medium.

In all cases for both linear and branched functionalized polyamines, the preferred procedure is to add one of the reactants progressively as the reaction proceeds under various controlled flow rates.

This process continues until the desired viscosity is reached, at which time the alkylating agent is added to the reaction mixture under controlled pH and temperature which is then cooled and/or diluted and/or pH adjusted, to give the corresponding end-capped polyamine.

Reference is now made to the following non-limitative examples.

1/ Preparation Method of Functionalized Polyamines:

In order to better illustrate our invention the following functionalized polyamines are presented: linear and branched polyamines prepared as described in the following paragraph, were end-capped with various amounts of Quat 188™ (3-chloro-2-hydroxypropyl-N,N,N-trimethylammonium chloride) spanning over a range of 1-100% of a predetermined desirable quantity.

a—Linear Polyamine:

A flask was charged with 60% dimethylamine (470 g) and water (198 g). A portion of 577 g of epichlorohydrin was added continuously over 3 h while keeping the temperature between 20-80° C. The solution was then monitored with a continuation of epichlorohydrin feed until a 1900-2000 cP viscosity value was achieved at 80° C. With the temperature elevated (>50° C.), an aqueous 60% Quat 188™ solution (54 g) was added (100%). After 30 m the entire solution was cooled slowly, and the Brookfield viscosity of the final polymer was determined to be 180 cP@51.2% solids at 25° C.

b—Branched Polyamine:

A flask was charged with 60% dimethylamine (422 g), ethylenediamine (16.9 g) and water (394 g). A portion of 579 g epichlorohydrin was added continuously over 3 h while keeping the temperature between 20-80° C. The yellow solution was then monitored with a continuation of epichlorohydrin feed until a 600-700 cP viscosity value was achieved at 80° C. With the temperature elevated (>50° C.), an aqueous 60% Quat 188™ solution (141 g) was added (100%). After 30 m the entire solution was cooled slowly, and the Brookfield viscosity of the final polymer was determined to be 690 cP@51.6% solids at 25° C.

2/ Efficiency Tests:

The NDMA reduction efficiency tests were measured relative to the corresponding uncapped polyamine (same composition & viscosity), i.e., without any addition of Quat 188™, i.e., as commercially available today in the water treatment market.

NDMA Analysis.

Prior to analysis, aqueous samples (350-750 mL) were mixed with the surrogate deuterated standard, NDMA-$d_6$ (10-300 ng/L), and Ambersorb 572 resin beads (200 mg), and placed on a platform shaker for 1.5-2 h. The beads were isolated via vacuum filtration, air dried for 4-6 h, transferred to a 2 mL amber vial, and dichloromethane (400-500 µL) was added to desorb the nitrosamines. The vial was mounted on an autosampler for analysis using an Agilent GC/MS (6890/5973) system with a Supelco Equity™-1701 or HP-5MS (30 m×250 µm×0.25 µm) column. The GC oven program was: initial temp=35° C., initial time=1 min; ramp rate 1=10° C./min, final temp=70° C., final time=0.0 min; ramp rate 2=2° C./min, final temp=72° C., final time=0.0 min; and ramp rate 3=15° C./min, final temp=240° C., final time=2.4 min. Nitrosamines were quantified by selective ion monitoring using m/z 74.1 (parent) and 42.1 (daughter) for NDMA, and m/z 80.1 (parent) and 48.1 (daughter) for NDMA-$d_6$. Using a large volume injector with 25 µL sample injection, the method detection limit of NDMA was ~1-2 ng/L.

Preparation of Monochloramine Stock Solution.

A monochloramine stock solution (~1000 mg as free chlorine per liter ($Cl_2$/L)) was freshly prepared by the slow addition of sodium hypochlorite into an ammonium chloride solution (Cl/N molar ratio=0.7). Concentrations of free chlorine and monochloramine were determined by the $N_1$/N-diethyl-p-phenylenediamine-ferrous ammonium sulfate titration method specified in "Standard Methods for the Examination of Water and Wastewater". A pH>8.5 was maintained using 10 mM bicarbonate or phosphate buffer during the reaction to minimize monochloramine disproportionation to dichloramine. The final preformed monochloramine solution was aged for 1 h in the dark and used within a day.

Example 1

The polyamines previously prepared were dissolved in various concentrations in water and exposed to various amounts of a disinfection reagent (preformed monochloramine). Reactions were quenched by ascorbic acid before NDMA analysis.

Results are listed as follows:

| Polyamine Description + Dosage | % of Theoretical Chain End Equivalents | Disinfectant Contact Time + Dosage* | NDMA Reduction Efficiency |
| --- | --- | --- | --- |
| Branched @ 10 mg/L | 1% | 24 hours @ 10 mg/L | 7% |
| Branched @ 10 mg/L | 10% | 24 hours @ 10 mg/L | 56% |
| Branched @ 10 mg/L | 100% | 24 hours @ 10 mg/L | 70% |
| Linear @ 10 mg/L | 10% | 24 hours @ 10 mg/L | 42% |
| Linear @ 10 mg/L | 100% | 24 hours @ 10 mg/L | 59% |

*Concentration of monochloramine expressed as milligrams of free chlorine per liter Example 2

The polyamines were used in various concentrations in a coagulation process on Mississippi river water. After optimization of the coagulation, floes were allowed to settle and supernatant was collected and exposed to various amounts of disinfection reagent (preformed monochloramine) for various exposure times. Reactions were quenched by ascorbic acid before NDMA analysis.

This example is supposed to better mimic real water treatment plant conditions with limited contact time and exposure of the polymer to the disinfection reagent.

| Polyamine Description + Dosage** | Aluminum sulfate | % of Theoretical Chain End Equivalents | Disinfectant Contact Time + Dosage* | NDMA Reduction Efficiency |
|---|---|---|---|---|
| Branched @ 3 mg/L | 0 mg/L | 1% | 4 hours @ 4 mg/L | 9% |
| Branched @ 3 mg/L | 0 mg/L | 10% | 2 hours @ 4 mg/L | 18% |
| Branched @ 3 mg/L | 0 mg/L | 100% | 2 hours @ 4 mg/L | 39% |
| Branched @ 3 mg/L | 0 mg/L | 100% | 4 hours @ 4 mg/L | 51% |
| Branched @ 0.5 mg/L | 90 mg/L | 10% | 2 hours @ 4 mg/L | 37% |
| Branched @ 0.5 mg/L | 90 mg/L | 100% | 2 hours @ 4 mg/L | 58% |
| Linear @ 3 mg/L | 0 mg/L | 100% | 2 hours @ 4 mg/L | 32% |
| Linear @ 0.5 mg/L | 90 mg/L | 100% | 2 hours @ 4 mg/L | 51% |

**Polyamine described was used to coagulate a river water sample with its supernatant exposed to disinfectant

CONCLUSION

Without affecting their coagulation efficiency, the functionalized polyamines of the present invention are superior NDMA reducing agents compared to the same polyamines of the prior art, after exposure to disinfection reagents.

Their improved efficiency enables lower NDMA levels to be achieved in the treated water and equal coagulation/flocculation when the water/wastewater treatment process is associated with a disinfection step, e.g., monochloramine.

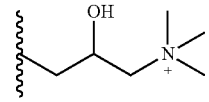

The invention claimed is:

1. A method of treating water or an aqueous-based system, comprising adding to the water or aqueous-based system a polymer that is a water-soluble cationic polyamine having at least one end group that is a residue of at least one alkylating agent, wherein said polymer is produced by a process comprising:
   polymerizing a reaction mixture in the absence of the alkylating agent to form a polyamine polymer having a desired viscosity; and
   after polymerizing, reacting the alkylating agent with the polyamine polymer to end-cap tertiary amine chain ends of the polyamine polymer,
wherein the reaction mixture comprises:
a) at least a secondary amine,
b) at least a difunctional epoxide, and
c) a polyfunctional amine.

2. A method according to claim 1 wherein the secondary amine is selected from dimethylamine, diethylamine, dipropylamines, and secondary amines containing mixtures of alkyl groups having 1 to 3 carbon atoms.

3. A method according to claim 1 wherein the difunctional epoxide is selected from the group consisting of epibromohydrin, epiiodohydrin, diepoxides, and epichlorohydrin.

4. A method according to claim 1 wherein the polyfunctional amine is selected from the group consisting of ethylenediamine, propylenediamine, hexamethylenediamine, diethylenetriamine, piperazine, triethylenetetramine, and bishexamethylenediamine.

5. A method according to claim 1 wherein the alkylating agent is selected from monofunctional epoxides, alkyl halides, benzyl chloride, dimethyl sulfate, diethyl sulfate, allyl chloride, and alkylating agents represented by the following formula:

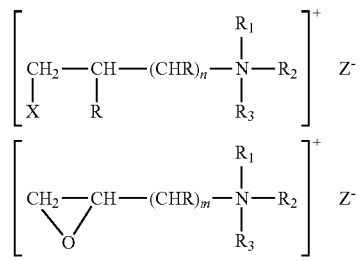

wherein X is a halogen,
Z is an anion,
R, $R_1$, $R_2$, and $R_3$, which can be the same or different, are independently selected from hydrogen, hydroxy, alkyl, hydroxyalkyl, alkenyl, and aryl groups,
n is 0-16, and
m is 1-16.

6. A method according to claim 5 wherein Z is a halide or hydroxyl group.

7. A method according to claim 1 wherein the alkylating agent is selected from 3 chloro-2-hydroxypropyl-N,N,N-dimethylethanolammonium chloride, 1,3-bis-(3-chloro-2-hydroxypropyl-N,N-dimethylammonium)-N-propane dichloride, 3-chloro-2-hydroxypropyl-N,N,N-trimethylammonium chloride, and 2,3-epoxypropyl-N,N,N-trimethylammonium chloride.

8. A method according to claim 1 wherein said polyamine is an (epichlorohydrin-dimethyl amine) polymer.

9. A method according to claim 1 wherein the water or aqueous based system is treated with the polymer during a process of coagulation and/or flocculation.